(12) United States Patent
Chan et al.

(10) Patent No.: US 9,998,720 B2
(45) Date of Patent: Jun. 12, 2018

(54) IMAGE PROCESSING METHOD FOR LOCALLY ADJUSTING IMAGE DATA OF REAL-TIME IMAGE

(71) Applicant: MEDIATEK INC., Hsin-Chu (TW)

(72) Inventors: Cheng-Che Chan, Hsinchu County (TW); Hung-Wei Chih, Taipei (TW); Chung-Yao Hung, Taipei (TW); Cheng-Che Chen, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days. days.

(21) Appl. No.: 15/151,507

(22) Filed: May 11, 2016

(65) Prior Publication Data
US 2017/0332060 A1     Nov. 16, 2017

(51) Int. Cl.
| | |
|---|---|
| H04N 9/64 | (2006.01) |
| G06T 5/00 | (2006.01) |
| G06T 7/40 | (2017.01) |
| H04N 5/232 | (2006.01) |
| H04N 9/793 | (2006.01) |

(52) U.S. Cl.
CPC ............ H04N 9/646 (2013.01); G06T 5/008 (2013.01); G06T 7/408 (2013.01); H04N 5/23216 (2013.01); H04N 9/793 (2013.01); G06T 2207/10016 (2013.01); G06T 2207/20208 (2013.01); G06T 2207/20216 (2013.01)

(58) Field of Classification Search
None
See application file for complete search history.

(56) References Cited

U.S. PATENT DOCUMENTS

| 9,432,583 | B2* | 8/2016 | Niemi | H04N 5/23293 |
| 2013/0314568 | A1* | 11/2013 | Vranceanu | H04N 5/2355 348/239 |
| 2013/0315476 | A1* | 11/2013 | Paris | G06T 11/001 382/155 |
| 2014/0176745 | A1* | 6/2014 | Pajak | H04N 5/225 348/211.99 |
| 2016/0139774 | A1* | 5/2016 | Rivard | G06F 3/04842 715/781 |

FOREIGN PATENT DOCUMENTS

| CN | 104935911 A | 9/2015 |
| TW | 201444364 A | 11/2014 |
| TW | 201525942 A | 7/2015 |
| TW | 201526640 A | 7/2015 |

* cited by examiner

*Primary Examiner* — James Hannett
(74) *Attorney, Agent, or Firm* — Han IP Corporation; Andy M. Han (57) ABSTRACT

An image processing method is provided. The image processing method includes the following steps: blending a plurality of exposure frames captured by one or more image capturing devices using a plurality of exposure times to generate a real-time image; analyzing one or more regions of interest (ROIs) of the real-time image according to ROI information about the one or more ROIs of the real-time image, and accordingly generating an analysis result; and utilizing an image processor for referring to the analysis result to locally adjust image data within the one or more ROIs of the real-time image to generate an adjusted real-time image in real time.

14 Claims, 8 Drawing Sheets

IMAGE PROCESSING METHOD FOR LOCALLY ADJUSTING IMAGE DATA OF REAL-TIME IMAGE

BACKGROUND

The disclosed embodiments of the present invention relate to image processing, and more particularly, to an image processing method for locally adjusting image data of the real-time image according to an analysis result of a region of interest (ROI) of the real-time image.

High dynamic range (HDR) video recording provides more details of a scene being recorded. However, the HDR video recording has to refer to image data of a whole image of the scene to enhance a dynamic range. The HDR video recording cannot further enhance image details of a specific region within an HDR video image according to user requirements. For example, in a case where one user hopes to enhance image details of a human face in an HDR video image while another user hopes to enhance image details of a background in the same HDR video image, the HDR video recording cannot meet different user requirements because the HDR video recording brightens or darkens of a video image globally.

Thus, there is a need for a novel image processing mechanism to meet different viewing requirements.

SUMMARY

In accordance with exemplary embodiments of the present invention, an image processing method for locally adjusting image data of the real-time image according to an analysis result of a region of interest (ROI) of the real-time image is proposed to solve the above-mentioned problems.

According to an embodiment of the present invention, an exemplary image processing method is disclosed. The exemplary image processing method comprises the following steps: blending a plurality of exposure frames captured by one or more image capturing devices using a plurality of exposure times to generate a real-time image; analyzing one or more regions of interest (ROIs) of the real-time image according to ROI information about the one or more ROIs of the real-time image, and accordingly generating an analysis result; and utilizing an image processor for referring to the analysis result to locally adjust image data within the one or more ROIs of the real-time image to generate an adjusted real-time image in real time.

The proposed image processing mechanism may perform local visual optimization on an HDR real-time image to enhance image details of local region(s) while maintaining a high dynamic range of the whole real-time image.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "coupled" is intended to mean either an indirect or direct electrical connection. Accordingly, if one device is electrically connected to another device, that connection may be through a direct electrical connection, or through an indirect electrical connection via other devices and connections.

In some embodiments, the proposed image processing mechanism may analyze at least one local region (a region of interest or an ROI) of a real-time image (a dynamic image or a video image) to locally adjust image data to the real-time image in real time, thus showing more image details of the at least one ROI. To facilitate an understanding of embodiments of the present invention, the proposed image processing mechanism is described using a real-time image obtained from a plurality of images or frames (e.g. an HDR video image obtained by blending a plurality of exposure frames). However, this is not meant to be a limitation of the present invention. As long as image data of a real-time image is locally adjusted according to an analysis result of an ROI of the real-time image, associated modifications and alternatives fall within the scope of the present invention. Further description is provided below.

Figure 1:
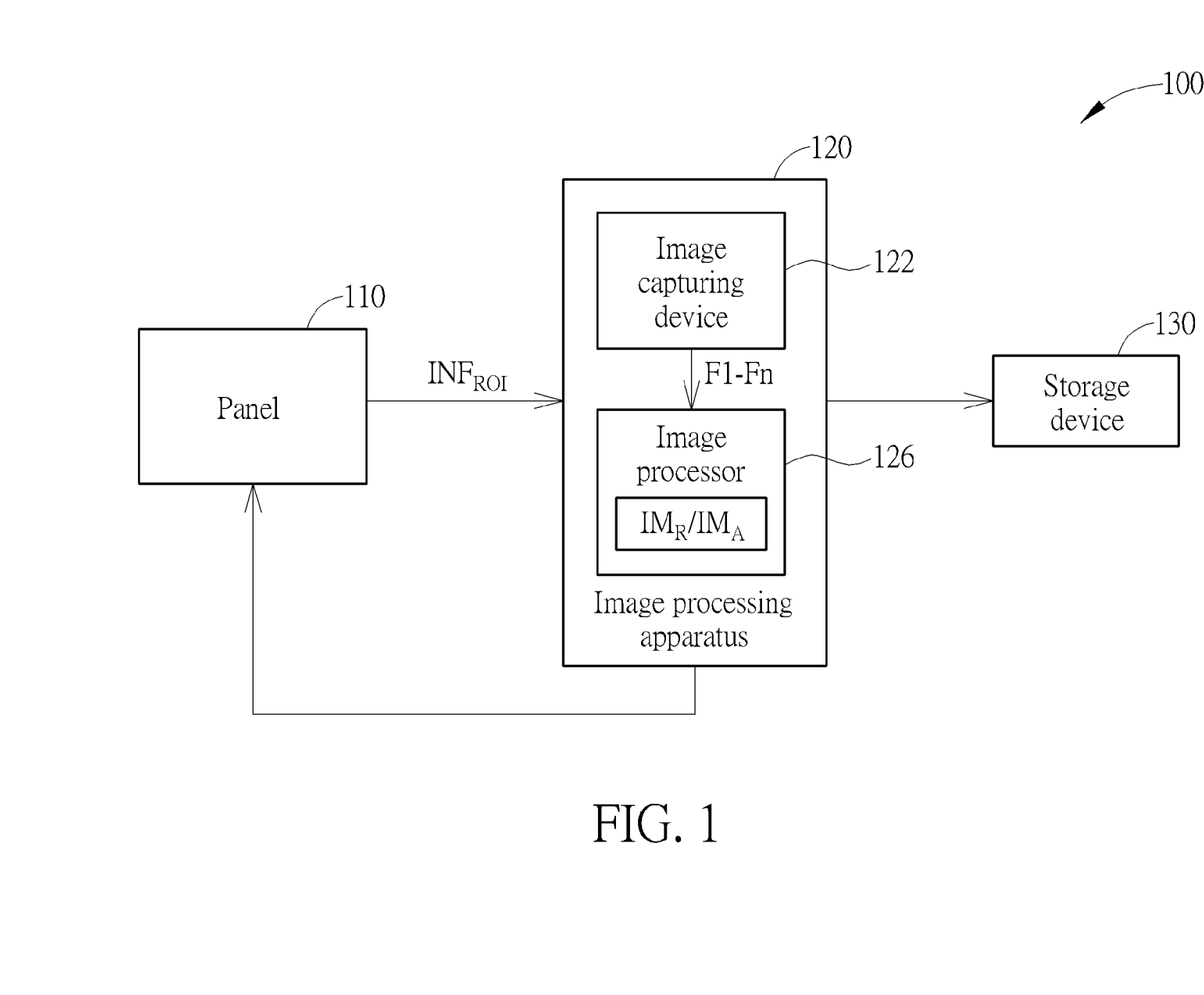
FIG. 1 is a block diagram illustrating an exemplary image processing system according to an embodiment of the present invention.

Please refer to FIG. 1, which is a block diagram illustrating an exemplary image processing system according to an embodiment of the present invention. The image processing system 100 may be implemented by any apparatuses capable of capturing and processing images, such as a mobile phone, a tablet computer, a personal computer, a camera, etc., and may include, but is not limited to a panel 110, an image processing apparatus 120 and a storage device 130. The image processing apparatus 120 may include an image capturing unit 122 and an image processor 126, wherein the image capturing unit 122 may capture images or frames of a scene and transmit the captured images to the image processor 126, and the image processor 126 may generate a real-time image $IM_R$ accordingly. In one implementation, the image processing apparatus 120 may transmit the generated real-time image $IM_R$ to the panel 110 to display a live preview of the scene. In another implementation, the image processing system 100 may utilize the storage device 130 (e.g. a memory device or a register) to store the real-time image $IM_R$ so as to record a video stream. For example, the image processing apparatus 120 may encode the real-time image $IM_R$ to generate encoded data, and store the encoded data in the storage device 130 to record the video stream.

In this embodiment, the image capturing unit 122 may use a plurality of exposure times to capture the scene to generate a plurality of exposure frames F1-Fn, and the image processor 126 may blend the exposure frames F1-Fn to generate the real-time image $IM_R$, wherein n is an integer greater than one. As the exposure frames F1-Fn correspond to different exposure times, the generated real-time image $IM_R$ may have a high dynamic range. In one implementation, the image capturing unit 122 may be implemented by an image capturing device having an HDR sensor, wherein the HDR sensor may capture the scene according to different exposure times so as to generate the exposure frames F1-Fn. In another implementation, the image capturing unit 122 may include a plurality of image capturing devices, which may capture the scene according to different exposure times respectively so as to generate the corresponding exposure frames F1-Fn. It should be noted that, as long as the image capturing unit 122 may use different exposure times to capture the scene to generate the exposure frames F1-Fn, the image capturing unit 122 may be implemented in various manners.

Additionally, when operative for recording an HDR video or capturing HDR video images, the image processing system 100 may be used for locally adjusting image data of the real-time image $IM_R$ in real time so as to further enhance quality of the recorded HDR video. By way of example but not limitation, the panel 110 may be implemented by a touch display panel. The user may select/touch one or more region of interests (ROIs) of the real-time image $IM_R$ displayed on the panel 110, and the panel 110 may generate ROI information $INF_{ROI}$ about the one or more ROIs accordingly, wherein the ROI information $INF_{ROI}$ may include position/coordinate information of the one or more ROIs selected by the user. The image processor 126 may analyze the one or more ROIs of the real-time image $IM_R$ according to the ROI information $INF_{ROI}$, and accordingly generate an analysis result. Next, the image processor 126 may refer to the analysis result to locally adjust image data of the real-time image $IM_R$ (e.g. adjusting image data within the one or more ROIs) to generate an adjusted real-time image $IM_A$ in real time. The panel 110 may display a live preview of the adjusted real-time image $IM_A$, and/or the image processing apparatus 120 may transmit the adjusted real-time image $IM_A$ to the storage device 130 for video recording.

Figure 2:
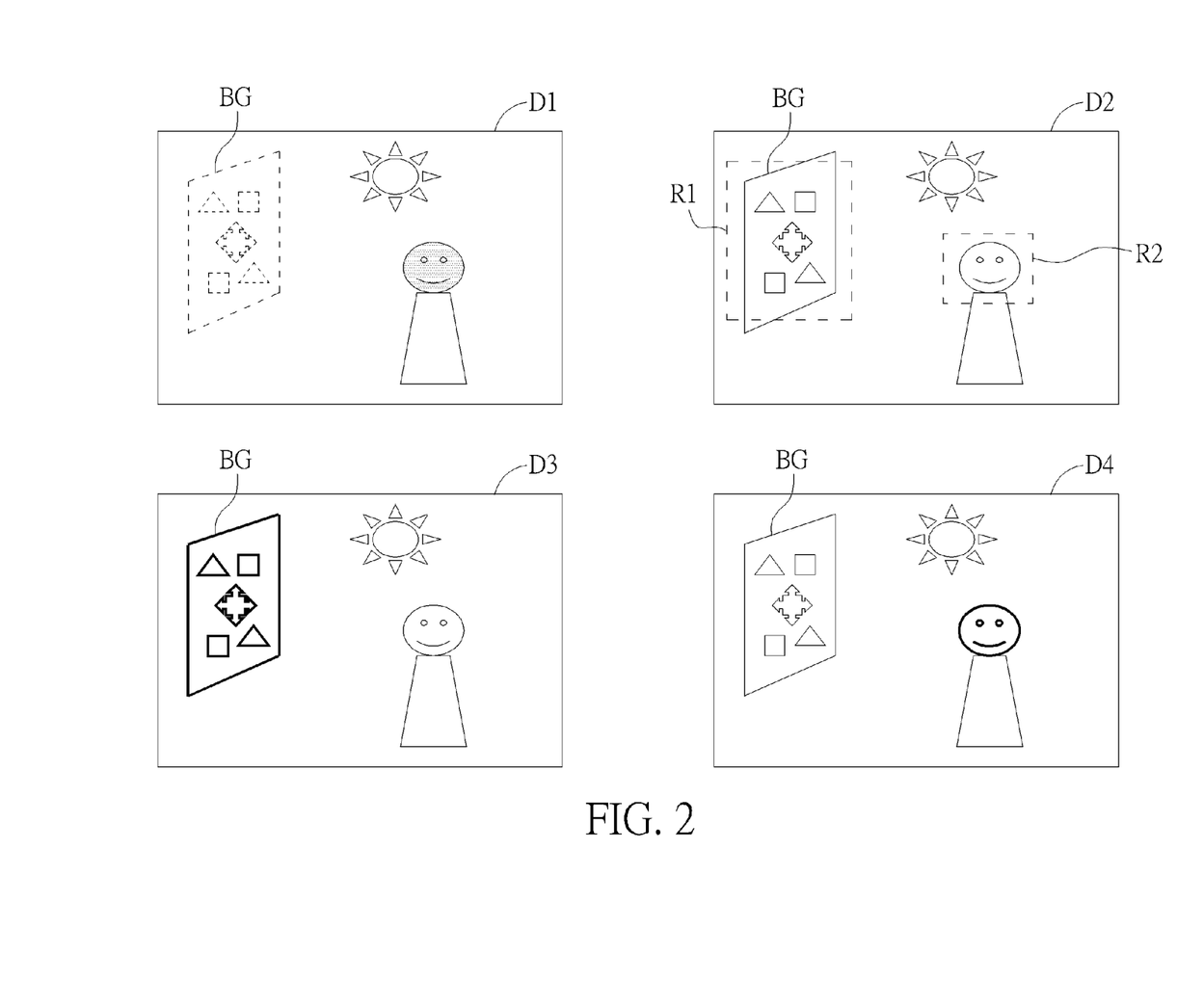
FIG. 2 is a diagram illustrating display contents displayed on the panel shown in FIG. 1 in different operating modes of the image processing system shown in FIG. 1 according to an embodiment of the present invention.

An example of the difference between the real-time image $IM_R$ and the adjusted real-time image $IM_A$ is shown in FIG. 2 for illustrative purposes. Please refer to FIG. 2 in conjunction with FIG. 1. FIG. 2 is a diagram illustrating display contents displayed on the panel 110 shown in FIG. 1 in different operating modes of the image processing system 100 shown in FIG. 1 according to an embodiment of the present invention. Firstly, as shown at top left portion of FIG. 2, in a case where the image processing system 100 operates in a normal video recording mode, a display picture D1 shows that a background BG is too bright due to overexposure and a human face is dark due to backlighting. When the image processing system 100 operates in an HDR video recording mode, both of the background BG and the human face in a display picture D2 (i.e. the real-time image $IM_R$ having a high dynamic range) are clear as compared to the display picture D1.

In addition, as mentioned above, the image processing system 100 may further enhance image details locally in the HDR video recording mode. For example, if the user hopes to enhance image details of the background BG, the user may select an ROI R1 on the display picture D2. The panel 110 may transmit the ROI information $INF_{ROI}$ associated with the ROI R1 to the image processing apparatus 120, and the image processing apparatus 120 may analyze the ROI R1 of the real-time image $IM_R$ according to the ROI information $INF_{ROI}$, thereby generating the adjusted real-time image $IM_A$ to enhance image details of the ROI R1 (a display picture D3 as shown at bottom left portion of FIG. 2). Similarly, if the user hopes to enhance image details of the human face, the user may select an ROI R2 on the display picture D2. The image processing apparatus 120 may generate the adjusted real-time image $IM_A$ to enhance image details of the human face (a display picture D4 as shown at bottom right portion of FIG. 2).

Please note that unselected image objects in the display picture D3/D4 (e.g. the human face and the sun in the display picture D3) may maintain image sharpness similar or identical to that of the display picture D2. This means that the image processing apparatus 120 may locally adjust the image data of the selected ROI R1 (e.g. adjusting brightness/luminance value(s) of the ROI R1 according to the analysis result thereof) while maintaining a high dynamic range of the whole image. Hence, the proposed image processing system may not only display/record an HDR video image but also enhance image details of one or more specific regions of the HDR video image, thus providing a better visual experience for the user.

In an alternative design, the user may touch/select multiple ROIs on the display picture D2 simultaneously. For example the user may touch the ROIs R1 and R2 simultaneously, and the panel 110 may output ROI information $INF_{ROI}$ associated with the ROIs R1 and R2 (including position/coordinate information of the ROIs R1 and R2) to the image processing apparatus 120. Next, the image processing apparatus 120 may output the adjusted real-time image $IM_A$ having enhanced image details of the background BG and the human face.

Figure 3:
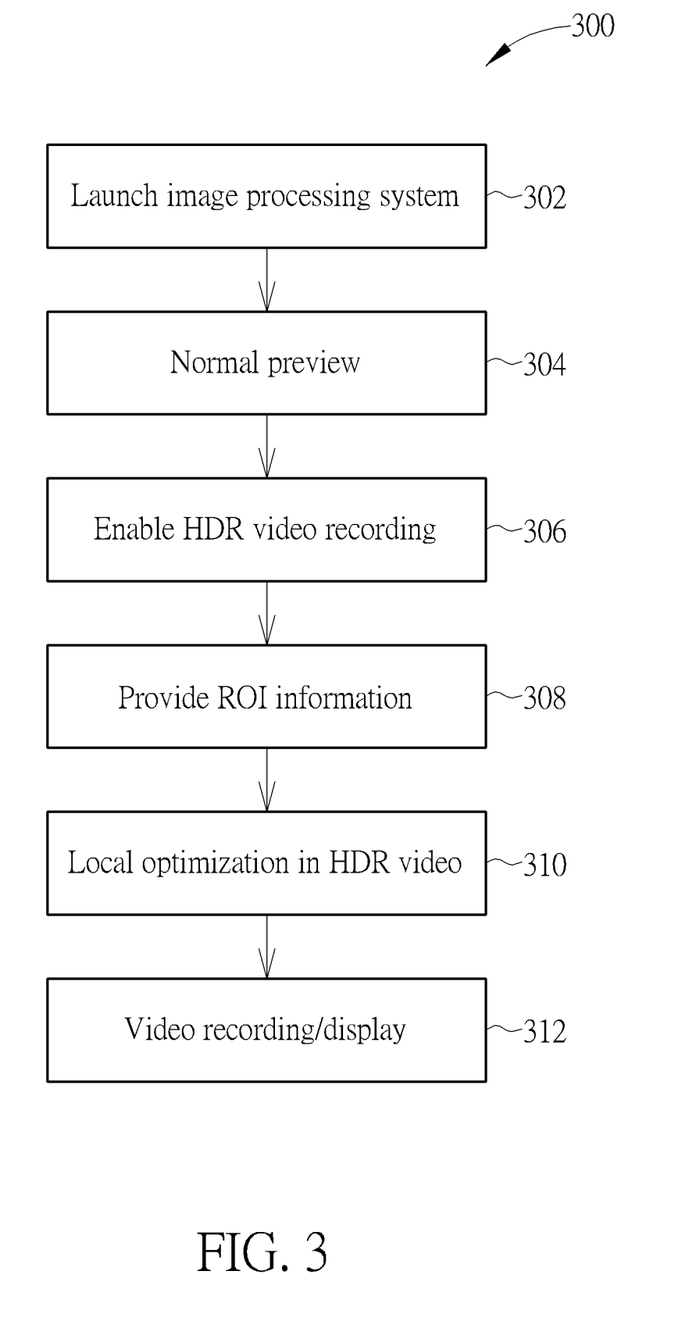
FIG. 3 is a flow chart of an exemplary control method of an image processing system according to an embodiment of the present invention.

The above-described real-time image generation method may be summarized in the flow chart shown in FIG. 3. FIG. 3 is a flow chart of an exemplary control method of an image processing system according to an embodiment of the present invention. For illustrative purposes, the control method 300 shown in FIG. 3 is described with reference to the image processing system 100 shown in FIG. 1. One skilled in the art should understand that this is not meant to be a limitation of the present invention. The control method 300 shown in FIG. 3 may be summarized below.

Step 302: Launch the image processing system 100. For example, activate a recording function of the image processing system 100.

Step 304: Provide a normal preview. For example, in a case where the image processing system 100 operates in a normal video recording mode (or a normal image capture mode), the panel 110 may display the real-time image $IM_R$ generated by the image processing apparatus 120 (e.g. the display picture D1 shown in FIG. 2).

Step 306: Enable an HDR video recording mode. When the image processing system 100 enables the HDR video recording mode, the real-time image $IM_R$ outputted from the image processing apparatus 120 may have a high dynamic range.

Step 308: Provide ROI information associated with one or more ROIs. For example, when the user touches one or more windows or select one or more ROIs of the real-time image $IM_R$ displayed on the panel 110 (e.g. the ROI R1 and/or the ROI R2 shown in FIG. 2), the panel 110 may accordingly generate the ROI information $INF_{ROI}$, which indicates the selected one or more ROIs, to the image processing apparatus 120.

Step 310: Perform local visual optimization on an HDR video (or an HDR video image). For example, the image processing apparatus 120 may analyze the one or more ROIs to generate an analysis result, and locally adjust the image data of the real-time image $IM_R$ according to the analysis result in order to perform the local visual optimization upon the HDR video (i.e. the real-time image $IM_R$).

Step 312: Display/record the HDR video which has been locally optimized. For example, the image processing apparatus 120 may perform the local visual optimization on the real-time image $IM_R$ to generate the adjusted real-time image $IM_A$, and transmit the adjusted real-time image $IM_A$ to the panel 110 to display a live preview of the adjusted real-time image $IM_A$. In another example, the image processing apparatus 120 may transmit the adjusted real-time image $IM_A$ to the storage device 130 for video recording. In yet another example, the image processing apparatus 120 may encode the adjusted real-time image $IM_A$ to generate encoded data, and then store the encoded data in the storage device 130 for video recording.

Please note that the above is for illustrative purposes only, and is not meant to be a limitation of the present invention. For example, provided that the result is substantially the same, the steps are not required to be executed in the exact order shown in FIG. 3 and are not required to be contiguous.

In view of the above, the proposed image processing system is capable of performing local visual optimization on an HDR video. Specifically, the image processing apparatus 120 shown in FIG. 1 may not only generate the HDR real-time image $IM_R$ but also adjust image details thereof in real time to thereby produce the adjusted real-time image $IM_A$. The image processing method used for the image processing apparatus 120 may be summarized in FIG. 4, which is flow chart of an exemplary image processing method according to an embodiment of the present invention. The image processing method may be summarized below with reference to FIG. 1 but not limited thereto.

Figure 4:
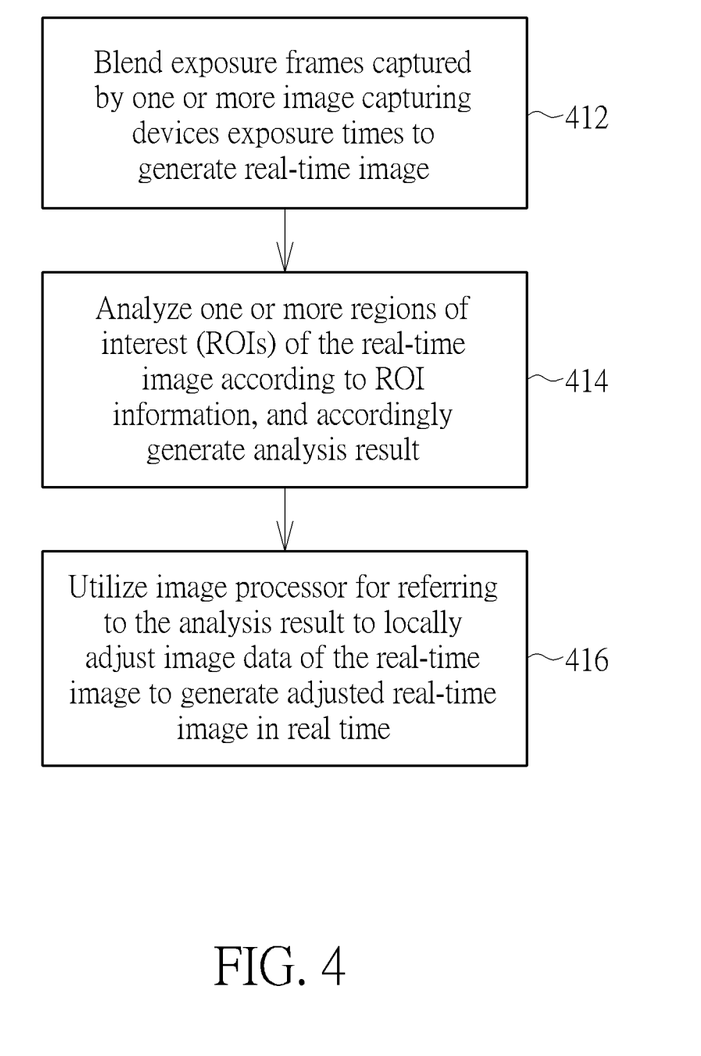
FIG. 4 is flow chart of an exemplary image processing method according to an embodiment of the present invention.

Step 412: Blend a plurality of exposure frames (e.g. the exposure frames F1-Fn) captured by one or more image capturing devices (e.g. the image capturing unit 122) using a plurality of exposure times to generate a real-time image (e.g. the real-time image $IM_R$).

Step 414: Analyze one or more ROIs of the real-time image according to ROI information about the one or more ROIs (e.g. the ROI information $INF_{ROI}$) of the real-time image, and accordingly generate an analysis result.

Step 416: Utilize an image processor (e.g. the image processor 126) for referring to the analysis result to locally adjust image data within the one or more ROIs of the real-time image to generate an adjusted real-time image (e.g. the real-time image $IM_A$) in real time.

For a better understanding of the present invention, the proposed image processing method is described with reference to an image processing apparatus employing an HDR sensor in the following. However, one skilled in the art should understand that this is not meant to be a limitation of the present invention. Please refer to FIG. 5, which is a block diagram illustrating an exemplary image processing apparatus according to an embodiment of the present invention. The image processing apparatus 120 shown in FIG. 1 may be implemented by the image processing apparatus 520 but not limited thereto. In this embodiment, the image processing apparatus 520 may include an image capturing unit 521 and an image processor 522, wherein the image capturing unit 122 and the image processor 126 shown in FIG. 1 may be implemented by the image capturing unit 521 and the image processor 522 respectively.

Figure 5:
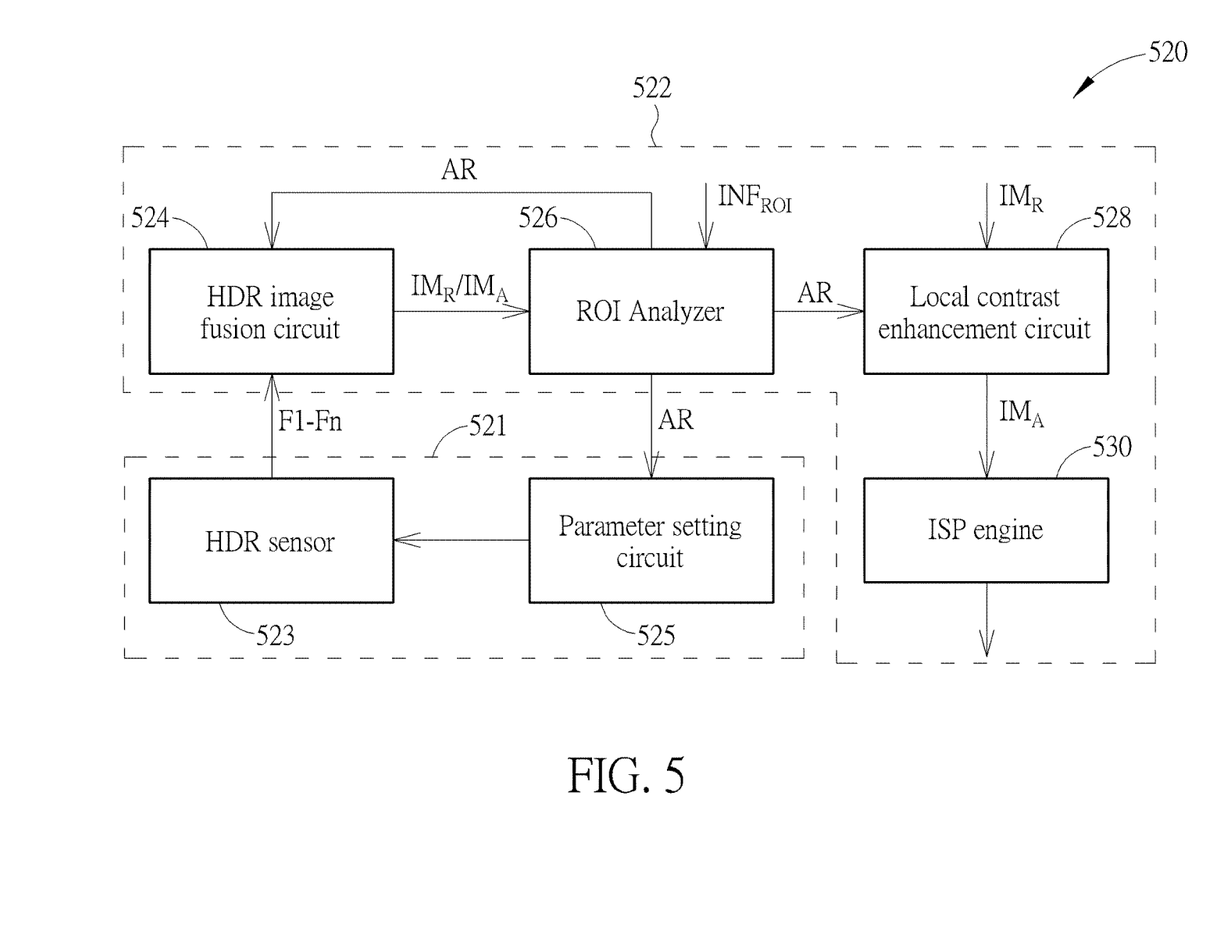
FIG. 5 is a block diagram illustrating an exemplary image processing apparatus according to an embodiment of the present invention.

The image capturing unit 521 may include an HDR sensor 523 and a parameter setting circuit 525, wherein the HDR sensor 523 may use different exposure times to capture a scene to generate a plurality of exposure frames F1-Fn, and the parameter setting circuit 525 may determine one or more setting parameters of the HDR sensor 523, such as auto white balance (AWB) parameter(s), auto exposure (AE) parameter(s), auto focus (AF) parameter(s), etc. In other words, the parameter setting circuit 525 may provide the one or more setting parameters for the HDR sensor 523 so as to set operation(s) of the HDR sensor 523 (e.g. at least one of AWB, AE and AF operations), thereby updating the exposure frames F1-Fn. The image processor 522 may adjust the image data of the real-time image $IM_R$ globally according to the updated exposure frames F1-Fn.

The image processor 522 may include an HDR image fusion circuit 524, an ROI analyzer 526, a local contrast enhancement (LCE) circuit 528 and an image signal processing (ISP) engine 530. In an HDR video recording mode, the HDR image fusion circuit 524 may blend the exposure frames F1-Fn to generate the real-time image $IM_R$ (a real-time image having a high dynamic range). When the image processor 522 receives the ROI information $INF_{ROI}$ (including position/coordinate information of one or more ROI of the real-time image $IM_R$), the ROI analyzer 526 may analyze the one or more ROI of the real-time image $IM_R$ according to the ROI information $INF_{ROI}$ to generate an analysis result AR, wherein the image processor 522 may perform local visual optimization on the real-time image $IM_R$ according to the analysis result AR to thereby generate the adjusted real-time image $IM_A$. For example, in a case where the HDR image fusion circuit 524 may refer to an image data mapping between digital values and scene radiance/brightness values to blend exposure frames to generate image data of a real-time image, the HDR image fusion circuit 524 may adjust a mapping (e.g. a non-linear mapping) between digital values and scene brightness values associated with image data of the one or more ROIs according to the analysis result AR, thereby generating image data for the adjusted real-time image $IM_A$.

Additionally or alternatively, in a case where the HDR image fusion circuit 524 may refer to an image data mapping between digital values and scene radiance/brightness values to blend exposure frames to generate image data of a real-time image, the HDR image fusion circuit 524 may use the analysis result AR as a feedback to adjust digital values range mapped from a high scene brightness range higher than a threshold range, thereby generating image data within the one or more ROIs of the adjusted real-time image $IM_A$. In some embodiments, the adjustment on HDR image processing may be performed for high levels of brightness (for example, brightness levels higher than a predetermined threshold).

Additionally or alternatively, the LCE circuit 528 may enhance local contrast within at least one ROI of the one or more ROIs of the real-time image $IM_R$ according to the analysis result AR, and accordingly generate the adjusted real-time image $IM_A$. In some embodiments, the local contrast enhancement may be performed for low and middle levels of brightness (for example, brightness levels lower than the predetermined threshold).

Additionally or alternatively, the parameter setting circuit 525 may adjust setting parameter(s) (e.g. AE parameter(s)) of the HDR sensor 523 according to the analysis result AR. The HDR sensor 523 may update the exposure frames F1-Fn accordingly, and the HDR image fusion circuit 524 may blend the updated exposure frames F1-Fn to generate the adjusted real-time image $IM_A$. In other words, the ROI analyzer 526 may provide the analysis result AR for the HDR image fusion circuit 524 as a feedback to adjust image blending operations thereof.

The above is for illustrative purposes only, and is not meant to be a limitation of the present invention. In an alternative design, the image processor 522 may refer to the analysis result AR to adjust at least one of the image blending operations of the HDR image fusion circuit 524, the setting parameter(s) of the HDR sensor 523 and the LCE operations of the LCE circuit 528. In another alternative design, the image processor 522 may analyze the one or more ROIs by determining whether image data of the one or more ROIs satisfies one or more predetermined criteria, generate the analysis result AR accordingly, and refer to the analysis result AR to adjust the image blending operations of the HDR image fusion circuit 524 or perform the LCE operations of the LCE circuit 528. Further description is provided below.

Figure 6:
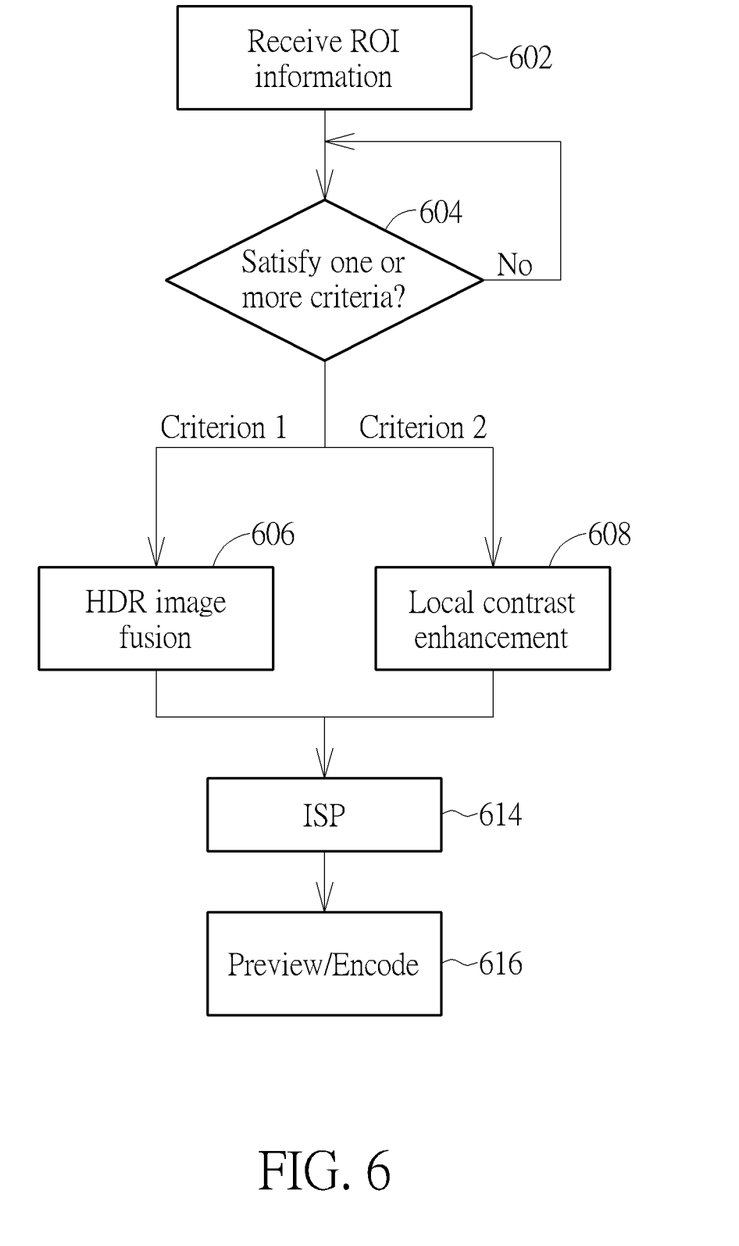
FIG. 6 is a flowchart of an exemplary image processing method according to an embodiment of the present invention.

Please refer to FIG. 6, which is a flow chart of an exemplary image processing method according to an embodiment of the present invention. In this embodiment, corresponding local visual optimization operations are performed according to whether image data of one or more ROIs satisfy predetermined criterion/criteria or not. For illustrative purposes, the image processing method shown in FIG. 6 is described with reference to the image processing apparatus 520 shown in FIG. 5. Additionally, provided that the result is substantially the same, the steps are not required to be executed in the exact order shown in FIG. 6 and are not required to be contiguous. The image processing method shown in FIG. 6 may be summarized below.

Step 602: The ROI analyzer 526 receives the ROI information $INF_{ROI}$.

Step 604: The ROI analyzer 526 determines whether respective image data (e.g. respective brightness values) of one or more ROIs of the real-time image $IM_R$ satisfies one or more predetermined criteria. If a first criterion is satisfied, go to step 606; if a second criterion is satisfied, go to step 608.

Step 606: When the analysis result AR indicates that at least one of respective image data of the one or more ROIs satisfies the first criterion, the HDR image fusion circuit 524 may adjust the blending of the exposure frames F1-Fn according to the at least one of the respective image data.

Step 608: When the analysis result AR indicates that at least one of respective image data of the one or more ROIs satisfies the second criterion, the LCE circuit 528 may enhance local contrast within at least one corresponding ROI of the real-time image $IM_R$.

Step 614: The ISP 530 may perform further processing of the adjusted real-time image $IM_A$ to optimize image signal quality.

Step 616: The ISP 530 may output the processed real-time image $IM_A$ for a live preview (e.g. outputting to a display screen), and/or encode the processed real-time image $IM_A$ for video recording.

In step 604, the ROI analyzer 526 may determine whether one or more respective brightness values of the one or more ROIs are greater than a threshold value. When the ROI analyzer 526 determines that at least one of the one or more respective brightness values is greater than the threshold value, the analysis result AR indicates that the first criterion is met. When the ROI analyzer 526 determines that at least one of the one or more respective brightness values is not greater than the threshold value, the analysis result AR indicates that the second criterion is met.

In step 606, when the analysis result AR indicates that the at least one of respective image data of the one or more ROIs satisfies the first criterion, the parameter setting circuit 525 may refer to the analysis result AR (further indicating the respective image data of the one or more ROIs) to determine one or more setting parameters to set operation(s) of the HDR sensor 523, wherein the operation(s) may include at least one of AWB, AE and AF operations. Hence, the HDR sensor 523 may perform image capturing according to the one or more setting parameters to thereby update the exposure frames F1-Fn. Next, the HDR image fusion circuit 524 may refer to the analysis result AR to blend the updated exposure frames F1-Fn to generate the adjusted real-time image $IM_A$.

In step 608, the LCE circuit 528 may perform the LCE on the least one corresponding ROI without affecting image data (e.g. brightness values) of other regions of the real-time image $IM_R$.

It should be noted that, in a case where the one or more ROIs includes ROIs which satisfy the first criterion and the second criterion, the image processor 522 may perform respective local visual optimization operations on the corresponding ROIs (e.g. step 606 and step 608).

Additionally, in an alternative design, the analysis result AR may include other types of image data, and the aforementioned criteria may be adjusted accordingly. In brief, as long as local visual optimization is performed on an HDR real-time image according to an ROI analysis result, associated modifications and alternatives fall within the scope of the present invention.

Figure 7:
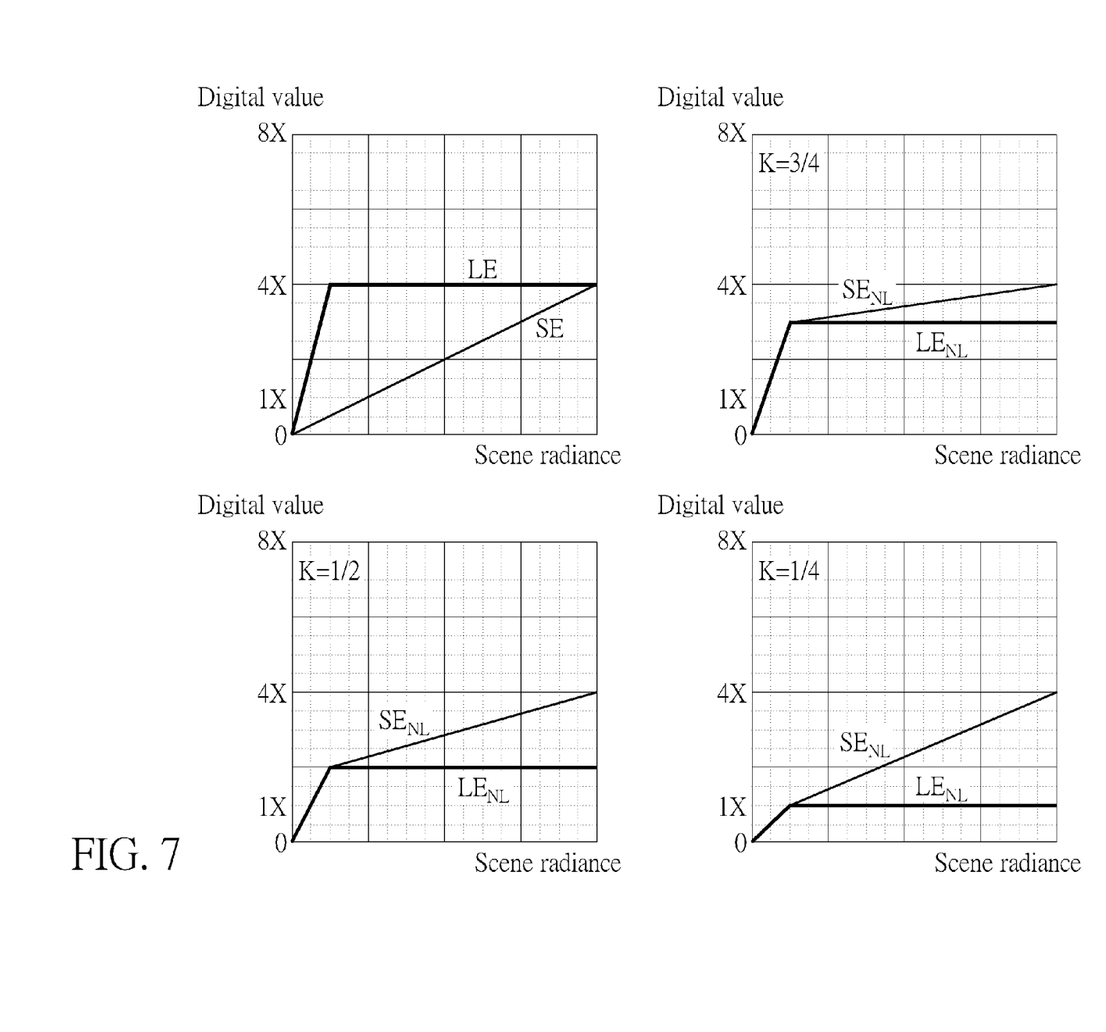
FIG. 7 is an implementation of the image blending operations of the HDR image fusion circuit shown in FIG. 5.

Further, in a case where the ROI analyzer 526 may determine whether at least one of the one or more respective brightness values is greater than a threshold value, the HDR image fusion circuit 524 may perform local visual optimization by adjusting blending parameter(s) used for blending the exposure frames F1-Fn. Please refer to FIG. 7 in conjunction with FIG. 5. FIG. 7 is an implementation of the image blending operations of the HDR image fusion circuit 524 shown in FIG. 5. For illustrative purposes, the HDR image fusion circuit 524 may blend two exposure frames F1 and F2 (i.e. n equals two), captured by the HDR sensor 523, to generate the real-time image $IM_R/IM_A$ in this implementation. Please note that the number of the exposure frames F1-Fn captured by the proposed image capturing unit is not limited to two.

As shown at top left portion of FIG. 7, the HDR image fusion circuit 524 may capture the exposure frame F1 according to an exposure signal LE (corresponding to a long exposure time), and capture the exposure frame F2 according to an exposure signal SE (corresponding to a short exposure time). In order to locally adjust the image data of the real-time image $IM_R$, the HDR image fusion circuit 524 may refer to a blending parameter K to determine a non-linear combination of the exposure signal LE and the exposure signal SE. For example, when the blending parameter K equals ¾, the exposure signal LE is adjusted to an exposure signal $LE_{NL}$, wherein a maximum digital value of an overexposed region decreases from 4× to 3×, and the exposure signal SE is adjusted to an exposure signal $SE_{NL}$, which is illustrated at top right portion of FIG. 7. Similarly, when the blending parameter K equals ½, the maximum digital value of the overexposed region decreases from 4× to 2× (as shown at bottom left portion of FIG. 7); when the blending parameter K equals ¼, the maximum digital value of the overexposed region decreases from 4× to 1× (as shown at bottom right portion of FIG. 7).

Based on the above adjustment of a non-linear mapping between digital values and scene radiance/brightness values associated with image data, the HDR image fusion circuit 524 may enhance image quality of overexposed region(s) by adjusting the blending parameter K. Specifically, when the analysis result AR indicates that at least one of respective brightness value(s) of the ROI(s) is greater than a threshold value, the HDR image fusion circuit 524 may adjust the blending of the exposure frames F1-Fn according to the at least one of the respective brightness value(s), wherein the HDR image fusion circuit 524 may determine the blending parameter K based on a lowest one of the at least one of the respective brightness value(s), and blend the exposure frames F1-Fn according to the blending parameter K. For example, the HDR image fusion circuit 524 may utilize the blending parameter K to control a non-linear mapping between digital values and scene brightness values associated with the image data of the ROI (s) for the adjusted real-time image $IM_A$. Additionally, in order to enhance image quality of overexposed region(s), the HDR image fusion circuit 524 may adjust digital values range mapped from a high scene brightness range higher than a threshold range (e.g. digital values greater than 4× in the embodiment shown in FIG. 7), thereby generating image data of the ROI (s) for the adjusted real-time image $IM_A$.

The above is for illustrative purposes only, and is not meant to be a limitation of the present invention. In an alternative design, the HDR image fusion circuit 524 may determine the blending parameter K according an average of the respective brightness values. In another alternative design, the HDR image fusion circuit 524 may blend the exposure frames F1-Fn in various manners (e.g. other non-linear mappings different from that shown in FIG. 7). In yet another alternative design, the HDR image fusion circuit 524 may enhance image details of region(s) having lower brightness values, such as underexposed region(s), within a real-time image according to the blending parameter K.

Further, the parameter setting circuit 525 may refer to the analysis result AR to adjust the exposure signals LE and SE utilized by the HDR sensor 523. In other words, the proposed image processing method may refer to an ROI analysis result to not only adjust blending operation of exposure frames (i.e. adjusting a combination of exposure signals) but also directly adjust the exposure signals used for capturing the exposure frames, thereby realizing local visual optimization of a real-time image. Moreover, it is possible to replace the HDR sensor 523 with a plurality of image capturing devices to capture a plurality of exposure frames.

Figure 8:
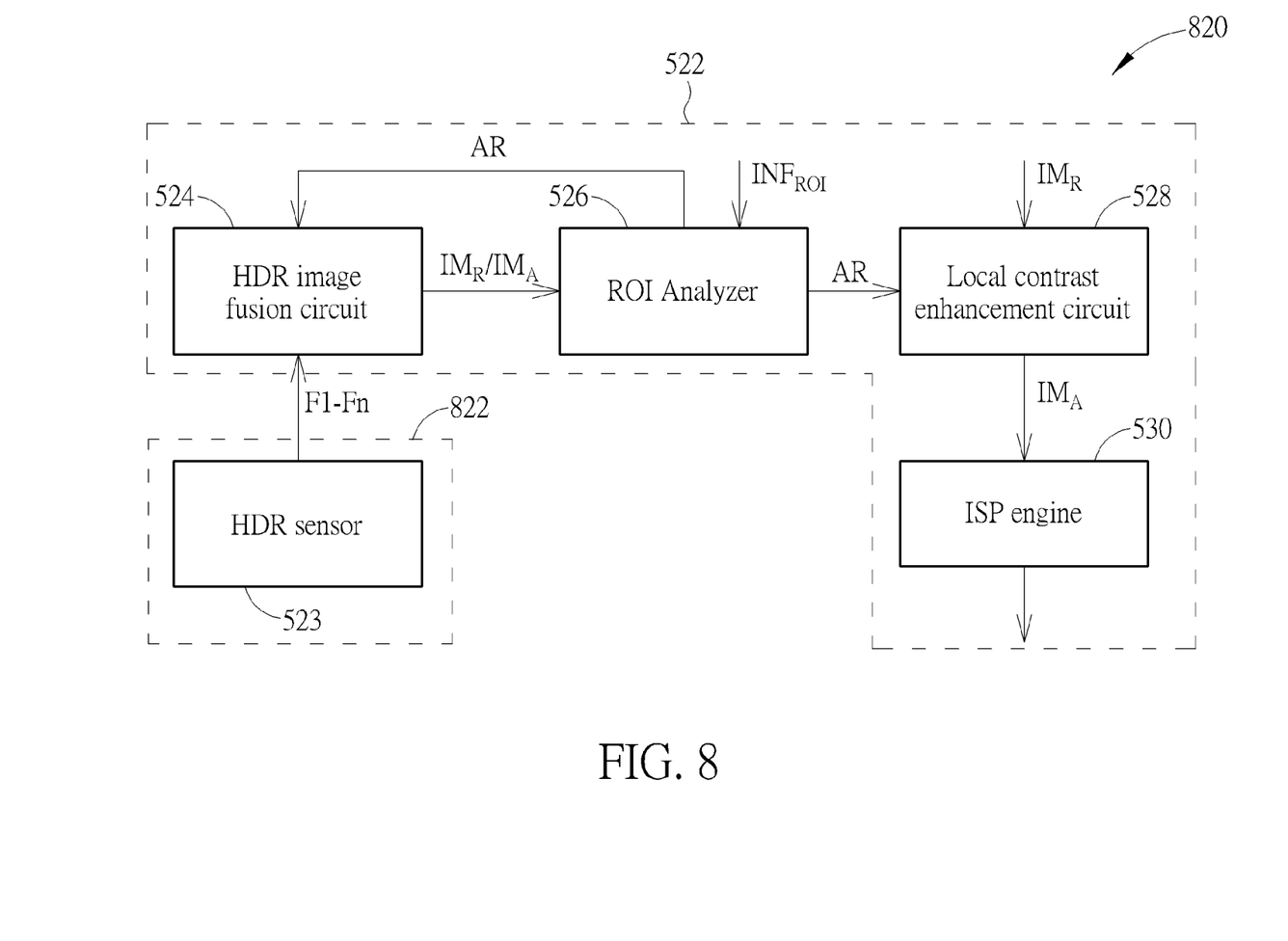
FIG. 8 is a block diagram illustrating an exemplary image processing apparatus according to an embodiment of the present invention.

According to the embodiments, the proposed image processing apparatus may perform local visual optimization on a real-time image without globally adjusting image data of the real-time image. In other words, setting parameters of image capturing device (s) may not be changed during local visual optimization. FIG. 8 is a block diagram illustrating an exemplary image processing apparatus according to an embodiment of the present invention. The structure of the image processing apparatus 820 is based on that of image processing apparatus 520 shown in FIG. 5, wherein the main difference is that a parameter setting circuit can be omitted in the image capturing unit 822. As a person skilled in the art, after reading the paragraphs directed to FIGS. 1-8, should understand that the image processing apparatus 820 can refer to the ROI information $INF_{ROI}$ to realize local visual optimization of the real-time image $IM_R$, further description is omitted here for brevity.

To sum up, the proposed image processing mechanism may perform local visual optimization on an HDR real-time image to enhance image details of local region(s) while maintaining a high dynamic range of the whole real-time image.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An image processing method, comprising:
  blending a plurality of exposure frames captured by one or more image capturing devices using a plurality of exposure times to generate a real-time image;
  analyzing one or more regions of interest (ROIs) of the real-time image according to ROI information about the one or more ROIs of the real-time image, and accordingly generating an analysis result; and
  referring to the analysis result to locally adjust image data within the one or more ROIs of the real-time image to generate an adjusted real-time image in real time by utilizing an image processor,
  wherein the step of referring to the analysis result to locally adjust the image data within the one or more ROIs of the real-time image to generate the adjusted real-time image in real time comprises:
    providing the analysis result as a feedback to adjust the blending of the different exposure frames so as to adjust a non-linear mapping between digital values and scene brightness values associated with the image data for the adjusted real-time image; or
    providing the analysis result as a feedback to adjust digital values range mapped from a high scene brightness range higher than a threshold range.

2. The image processing method of claim 1, wherein the step of analyzing the one or more ROIs of the real-time image comprises:
  determining whether one or more respective brightness values of the one or more ROIs satisfy one or more predetermined criteria.

3. The image processing method of claim 2, wherein the step of determining whether the one or more respective brightness values of the one or more ROIs satisfy one or more predetermined criteria comprises:
  determining whether the one or more respective brightness values are greater than a threshold value.

4. The image processing method of claim 3, wherein the step of referring to the analysis result to locally adjust the image data within the one or more ROIs of the real-time image further comprises:
  when the analysis result indicates that at least one of the one or more respective brightness values is not greater than the threshold value, enhancing local contrast within at least one corresponding ROI of the real-time image.

5. The image processing method of claim 3, wherein the step of referring to the analysis result to locally adjust the image data within the one or more ROIs of the real-time image further comprises:
when the analysis result indicates that at least one of the one or more respective brightness values is greater than the threshold value, adjusting the blending of the different exposure frames according to the at least one of the one or more respective brightness values.

6. The image processing method of claim 5, wherein the step of adjusting the blending of the different exposure frames according to the at least one of the one or more respective brightness values comprises:
determining a blending parameter based on a lower one of the at least one of the one or more respective brightness values; and
blending the different exposure frames according to the blending parameter.

7. The image processing method of claim 6, wherein the step of blending the different exposure frames according to the blending parameter comprises:
utilizing the blending parameter to control a non-linear mapping between digital values and scene brightness values associated with the image data for the adjusted real-time image.

8. The image processing method of claim 7, wherein the step of controlling the non-linear mapping between the digital values and the scene brightness values associated with the image data for the adjusted real-time image comprises:
adjusting digital values range mapped from a high scene brightness range higher than a threshold range.

9. The image processing method of claim 1, wherein the step of referring to the analysis result to locally adjust the image data within the one or more ROIs of the real-time image to generate the adjusted real-time image in real time further comprises:
enhancing local contrast within at least one ROI of the one or more ROIs.

10. The image processing method of claim 1, further comprising:
displaying the adjusted real-time image.

11. The image processing method of claim 1, further comprising:
encoding the adjusted real-time image.

12. The image processing method of claim 1, further comprising:
globally adjusting image data of the real-time image.

13. The image processing method of claim 12, wherein the step of globally adjusting the image data of the real-time image comprises:
determining one or more setting parameters; and
providing the one or more setting parameters to set operation of the one or more image capturing devices.

14. The image processing method of claim 13, wherein the one or more setting parameters are configured for setting at least one of the following operations: auto white balance (AWB), auto exposure (AE) and auto focus (AF) of the one or more image capturing devices.

\* \* \* \* \*